United States Patent
Autry et al.

(10) Patent No.: US 6,418,195 B1
(45) Date of Patent: Jul. 9, 2002

(54) APPARATUS FOR COMMUNICATING A DIAGNOSTIC DEVICE WITH A TELECOMMUNICATIONS SYSTEM THROUGH A REMOTE NETWORK UNIT

(75) Inventors: John Autry, Colleyville; Mark Szewczul, Bedford, both of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/476,079

(22) Filed: Dec. 30, 1999

(51) Int. Cl.[7] .............................. H04M 1/24; H04M 9/08
(52) U.S. Cl. .................... 379/21; 379/1.01; 379/26.01; 379/27.07; 379/29.11; 379/413.03
(58) Field of Search ..................... 379/1.01, 21, 26.01, 379/27.01, 27.07, 29.01, 29.11, 399.01, 412, 413.02, 413.03, 413.04; 439/246, 248, 622, 676, 701, 712, 825, 866

(56) References Cited

U.S. PATENT DOCUMENTS

| | | | |
|---|---|---|---|
| 4,117,264 A | * 9/1978 | Charles et al. ................. 179/1 |
| 4,277,740 A | 7/1981 | Parks | |
| 4,288,660 A | * 9/1981 | Fasano ............................ 179/1 |
| 4,298,239 A | 11/1981 | Montalto et al. | |
| 4,585,290 A | * 4/1986 | Knickerbocker et al. . 339/97 R |
| 4,620,282 A | 10/1986 | Shelley | |
| 4,655,521 A | * 4/1987 | Thomas ..................... 339/31 R |
| 4,729,059 A | * 3/1988 | Wang ........................... 379/412 |
| 4,944,698 A | * 7/1990 | Siemon et al. .............. 379/676 |
| 5,155,440 A | 10/1992 | Huang | |
| 5,228,072 A | 7/1993 | Ingalsbe et al. | |
| 5,260,994 A | * 11/1993 | Suffi ............................. 379/399 |
| 5,309,092 A | 5/1994 | Kuntz et al. | |
| 5,359,657 A | * 10/1994 | Pelegris ....................... 379/412 |
| 5,361,293 A | 11/1994 | Czerwiec | |
| 5,414,343 A | 5/1995 | Flaherty et al. | |
| 5,680,391 A | 10/1997 | Barron et al. | |
| 5,687,213 A | * 11/1997 | Larkin .......................... 379/21 |
| 5,745,795 A | * 4/1998 | Pecone et al. ............... 395/882 |
| 5,757,680 A | * 5/1998 | Boston et al. ................ 379/21 |
| 5,835,567 A | * 11/1998 | Woods ......................... 439/27 |
| 6,149,458 A | * 11/2000 | Daoud ......................... 439/509 |

OTHER PUBLICATIONS

Marconi Communications, DLP 304 Termination Block Testing, pp. 1–2, Jan., 1999.

* cited by examiner

Primary Examiner—Curtis Kuntz
Assistant Examiner—Qvoc Tran
(74) Attorney, Agent, or Firm—Jones, Day, Reavis & Pogue

(57) ABSTRACT

An apparatus communicates a diagnostic device with a telecommunications service source, or alternatively with a telecommunications service subscriber device, through a remote network unit. The apparatus includes a test plug structure receivable in operative engagement with a panel of over-voltage protection receptacles in the remote network unit. The apparatus further includes an engagement structure which connects the test plug structure with the diagnostic device in a plurality of selectable alternative conditions. These include a first condition in which the engagement structure communicates the diagnostic device with the service source through the test plug structure, and a second condition in which the engagement structure communicates the diagnostic device alternatively with the subscriber device through the test plug structure.

3 Claims, 3 Drawing Sheets

APPARATUS FOR COMMUNICATING A DIAGNOSTIC DEVICE WITH A TELECOMMUNICATIONS SYSTEM THROUGH A REMOTE NETWORK UNIT

FIELD OF THE INVENTION

The present invention relates to a system that provides telecommunications services to subscriber devices at one or more subscriber premises. The present invention particularly relates to testing of components of the system.

BACKGROUND OF THE INVENTION

A telecommunications system transmits telecommunications services between service sources and subscriber devices. Service sources typically include the public switched telephone network (PSTN) and the Internet. Subscriber devices typically include telephones and computers. The present invention is used with a system that includes a plurality of remote network units, each of which communicates the service sources with subscriber devices at one or more subscriber premises.

SUMMARY OF THE INVENTION

The present invention is an apparatus that communicates a diagnostic device with a telecommunications service source, or alternatively with a telecommunications service subscriber device, through a remote network unit. Such a unit has a panel of over-voltage protection receptacles that are interposed between the service source and the subscriber device.

The apparatus comprises a test plug structure and an engagement structure. The test plug structure is receivable in operative engagement with the panel of over-voltage protection receptacles in the remote network unit. The engagement structure is configured to connect the test plug structure with the diagnostic device in a plurality of selectable alternative conditions. In a first condition, the engagement structure communicates the diagnostic device with the service source through the test plug structure. In a second condition, the engagement structure communicates the diagnostic device alternatively with the subscriber device through the test plug structure.

The engagement structure in a preferred embodiment of the invention includes first and second test connectors alternatively receivable in operative engagement with the diagnostic device in the first and second conditions, respectively. The test plug structure in this embodiment includes a pair of test plugs receivable in operative engagement with a pair of over-voltage protection receptacles in the remote network unit. Another preferred embodiment of the invention includes only one such test plug.

DESCRIPTION OF PREFERRED EMBODIMENTS

Figure 1:
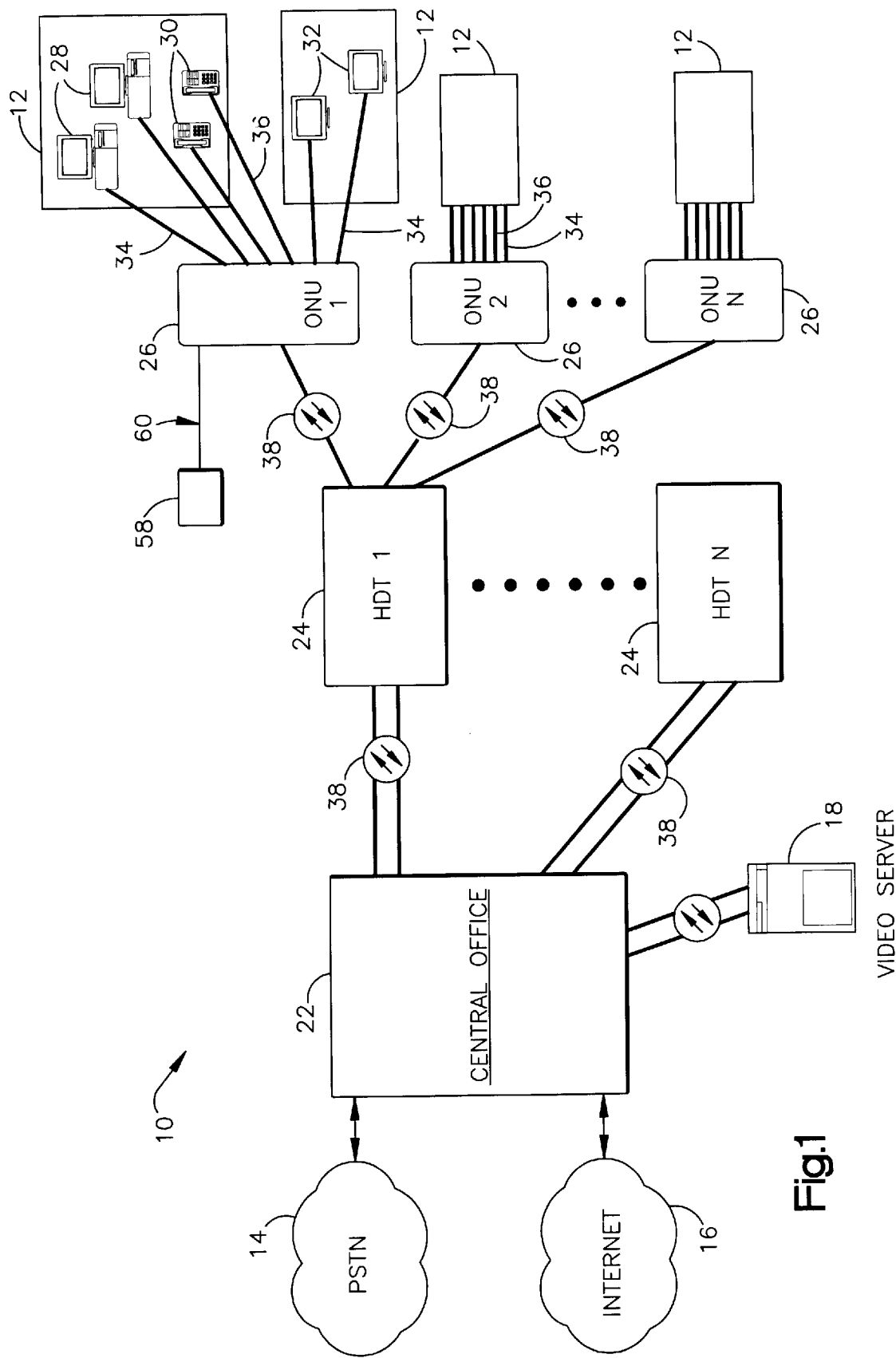
FIG. 1 is a schematic view of an example of a telecommunications system in which the present invention may be used.

A telecommunications system 10 is shown schematically in FIG. 1. The system 10 is a fiber-to-the-curb (FTTC) system connecting a plurality of subscriber premises 12 with various sources of telecommunication services. As shown for example in FIG. 1, the service sources include the PSTN 14, the Internet 16, and a video server 18. Additional service sources also could be included. The FTTC system 10 includes a central office switching station 22, a plurality of host digital terminals 24 (HDT's) and a plurality of remote network units 26.

Each remote network unit 26 interfaces a single HDT 24 with the subscriber devices at one or more subscriber premises 12. The subscriber devices typically include computers 28, telephones 30 and televisions 32, and are connected with the remote network unit 26 by subscriber lines including coaxial cables 34 and copper wires 36. The remote network units 26 in the example system 10 are optical network units (ONU's). Accordingly, each HDT 24 in the example system 10 is connected with a respective group of ONU's 26, and also with the central office switching station 22, by optical fiber cables 38. The central office switching station 22 connects the HDT's 24 with the service sources 14–18 in a known manner.

The ONU's 26 are pedestal type structures. As shown for example in FIG. 2, the pedestal configuration is defined by a generally rectangular housing 40 which projects upward from beneath the ground line 41. The cables and wires 34, 36 and 38 of FIG. 1, as well as a power cable (not shown), are routed upward into the housing 40 through an open lower end 42 of the housing 40. A removable access panel 44 extends nearly the entire height of the housing 40 above the ground line 41.

Figure 2:
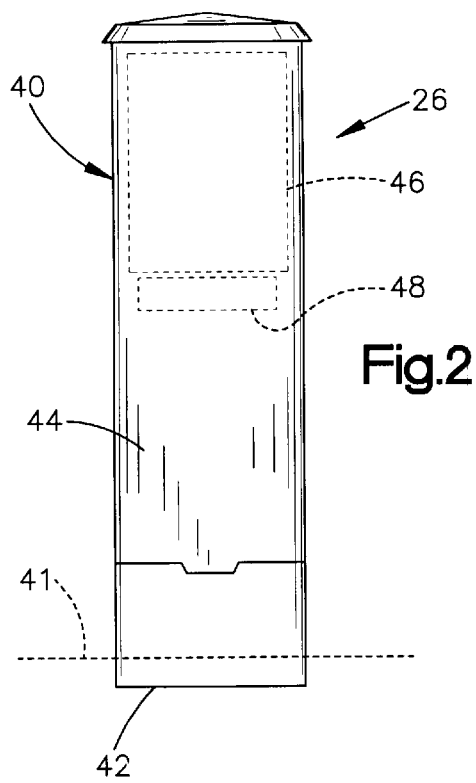
FIG. 2 shows an example of a structure common to several of the system components shown schematically in FIG. 1.

As shown schematically in FIG. 2, the housing 40 contains an electronics assembly 46. The electronics assembly 46 comprises electrical circuitry for the particular telecommunications services provided to each of the premises 12 served by the ONU 26. Other electrical devices (not shown), such as terminal blocks for subscriber drops, power pair protection blocks, a fiber optic splice closure, etc., also are contained in the housing 40. Those devices may be interconnected with the electronics assembly 46 in any suitable manner known in the art.

Figure 3:
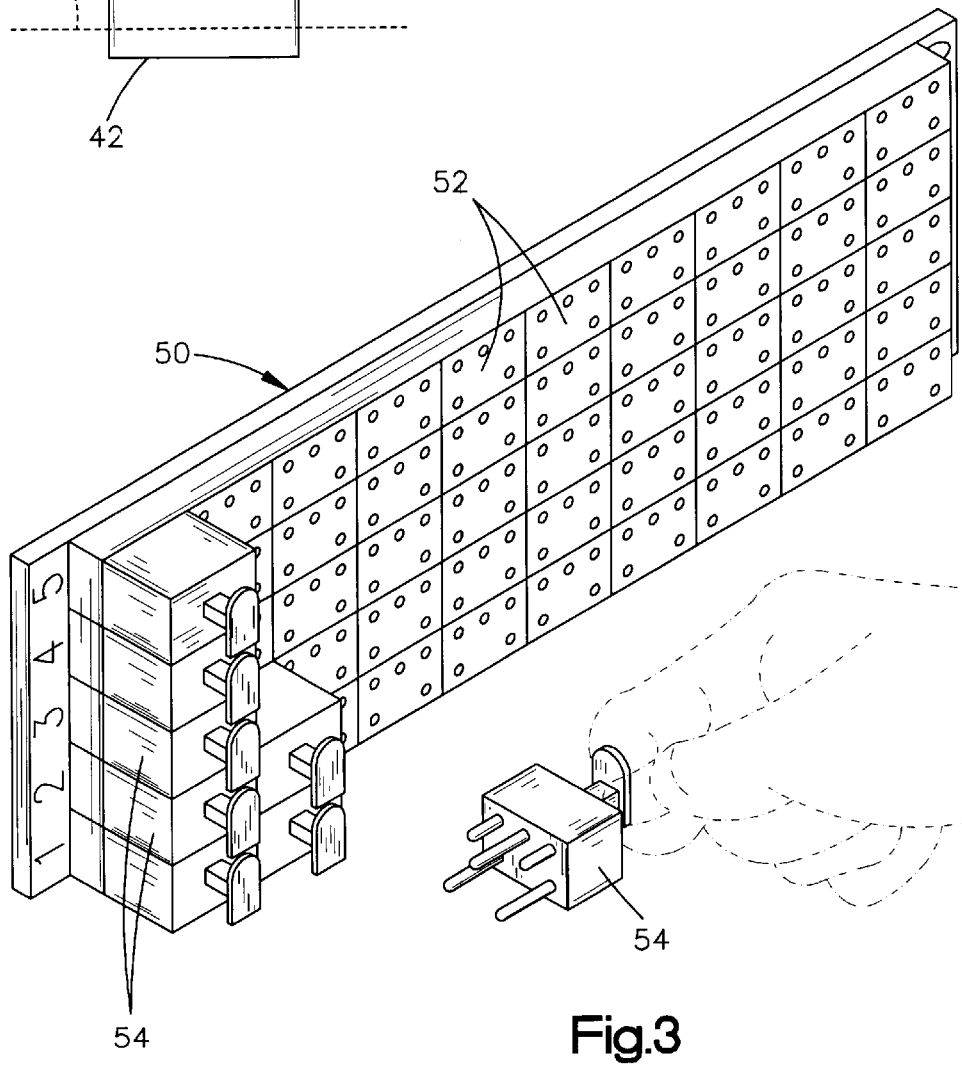
FIG. 3 is a more detailed view of a component shown schematically in FIG. 2.

The housing 40 also contains a subscriber protector box 48 for lightning or other over-voltage protection. The protector box 48 contains a panel 50 (FIG. 3) of over-voltage protection receptacles 52. The panel 50 in the illustrated embodiment includes fifty protection receptacles 52, and is thus configured to serve as many as fifty subscriber lines. More specifically, the panel 50 links all of the protection receptacles 52 with the telecommunications service sources 14, 16 and 18. Each receptacle 52 is linked with a respective subscriber line. Over-voltage protection modules 54, several of which are shown in FIG. 3, are plugged into the receptacles 52 as needed to link the service sources 14, 16 and 18 with the subscriber lines through the receptacles 52. When a module 54 is operatively engaged with a receptacle 52 in this manner, it provides over-voltage protection between the service sources 14, 16 and 18 and the respective subscriber line, as known in the art.

The present invention accesses the system 10 through the subscriber protector box 48. This enables components of the system 10 to be tested by the use of a diagnostic device 58 (FIG. 1) that communicates with the system 10 through the protector box 48. The diagnostic device 58 may comprise, for example, a laptop computer. Access to the system 10 is accomplished in accordance with the invention by removing the protection module 54 from one or more of the protection receptacles 52 in the protector box 48, and by coupling the diagnostic device 58 to those receptacles 52.

Figure 4:
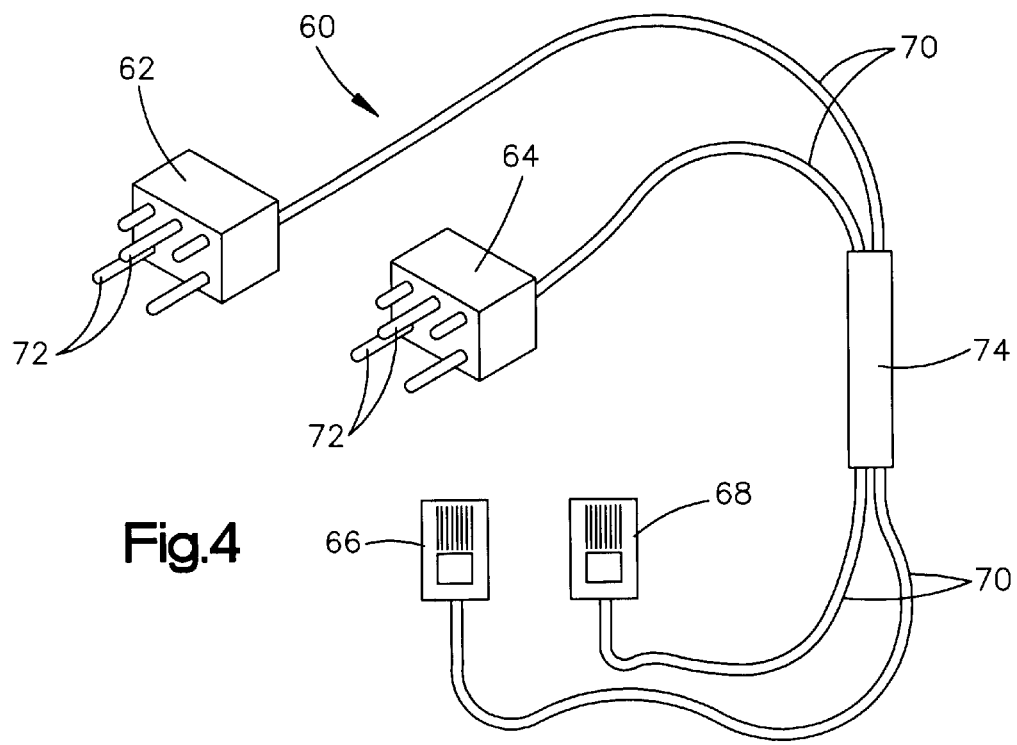
FIG. 4 is a view of an apparatus comprising a first embodiment of the invention.

An apparatus 60 comprising a first embodiment of the invention is shown in FIG. 4. This apparatus 60 includes a pair of test plugs 62 and 64 and a pair of test connectors 66 and 68. A plurality of signal transmission wires 70 connect the test plugs 62 and 64 to the test connectors 66 and 68 such that the coupling apparatus 60 in the first embodiment is a unitary assembly of parts.

Each of the test plugs 62 and 64 in the first embodiment is an industry standard five-prong device that can be plugged into any one of the protection receptacles 52 (FIG. 3) in place of a protection module 54. One of the prongs 72 on each test plug is a ground prong. Two of the prongs 72 on each test plug are utilized to communicate with the service sources 14, 16 and 18 through the protection receptacle 52 in which the test plug is received. The other two prongs 72 on each test plug are utilized to communicate with the subscriber line corresponding to the protection receptacle 52 in which the test plug is received. Moreover, the coupling apparatus 60 is equipped with two test plugs 62 and 64 (rather than only one) such that the first test plug 62 can transmit Ethernet data, and the second test plug 64 can receive Ethernet data, when both test plugs 62 and 64 are engaged with the panel 50 through a pair of protection receptacles 52.

Each of the test connectors 66 and 68 in the first embodiment is an industry standard modular plug, specifically an RJ-45 connector. Accordingly, the test connectors 66 and 68 are alternatively receivable in operative engagement with a single jack on the laptop 58. The signal transmission wires 70 connect the first test connector 66 with the two prongs 72 on the first test plug 62 that communicate with the service sources 14, 16 and 18. The wires 70 further connect the first test connector 66 with the two prongs 72 on the second test plug 64 that communicate with the service sources 14, 16 and 18. In a similar but alternative arrangement, the wires 70 connect the second test connector 68 with the two prongs 72 on the first test plug 62 that communicate with a subscriber line, and also with the two prongs 72 on the second plug 68 that communicate with a subscriber line.

As noted above, the test plugs 62 and 64 and the test connectors 66 and 68 are standard parts. Accordingly, the signal transmission wires 70 are defined by standard lead wires that project from those parts 62, 64, 66 and 68. A protective sleeve 74 is received over the wires 70 to cover splices that enable them to interconnect the test connectors 66 and 68 with the test plugs 62 and 64 in the foregoing arrangement. This arrangement of wires 70 causes the test plugs 62 and 64, when plugged into a pair of protection receptacles 52, to couple the first test connector 66 with the service sources 14, 16 and 18 through the remote network unit 26, and also to couple the second test connector 68 with the corresponding pair of subscriber lines through the remote network unit 26. The laptop 58 can then communicate with the service sources 14, 16 and 18 through the first test connector 66 when the first test connector 66 is plugged into the laptop 58. The laptop 58 can alternatively communicate with the subscriber lines, and thereby with a subscriber device such as computer, through the second test connector 68 when the second test connector 68 is alternatively plugged into the laptop 58.

Figure 5:
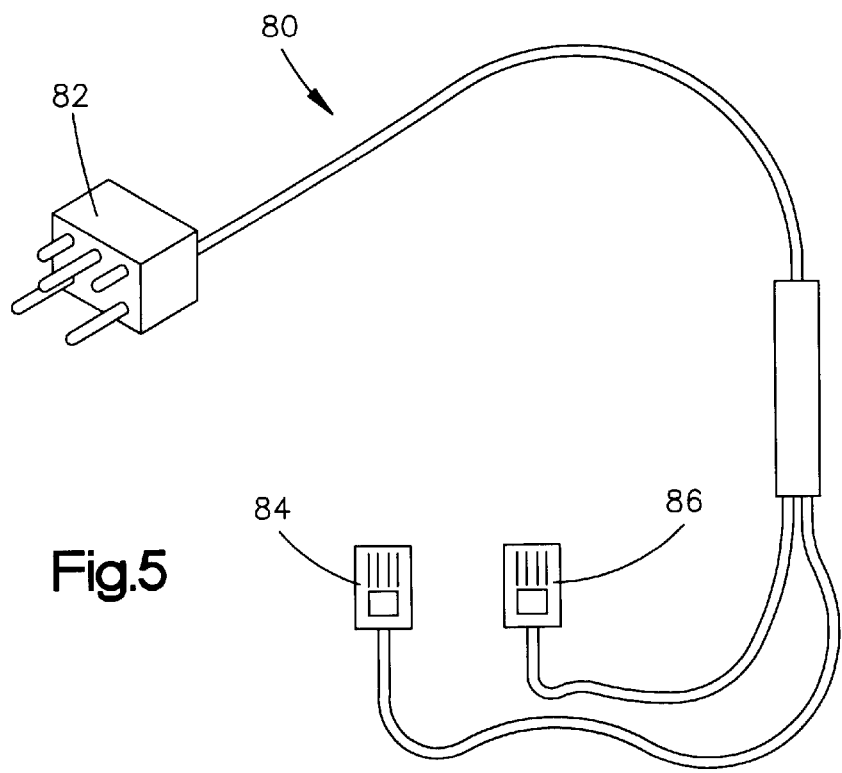
FIG. 5 is a view of an apparatus comprising a second embodiment of the invention.

An apparatus 80 comprising a second embodiment of the invention is shown in FIG. 5. Unlike the apparatus 60 described above, the apparatus 80 includes only a single test plug 82 rather than a pair of test plugs. The test connectors 84 and 86 are RJ-11 connectors rather than RJ-45 connectors. The apparatus 80 is otherwise substantially the same as the apparatus 60, and is thus configured for POTS testing, rather than Ethernet testing, in accordance with the invention.

The invention has been described with reference to preferred embodiments. Those skilled in the art will perceive improvements, changes and modifications. Such improvements, changes and modifications are intended to be within the scope of the claims.

We claim:

1. Apparatus for use with a remote network unit having a panel of over-voltage protection receptacles interposed between a telecommunications service source and a subscriber device, said apparatus comprising:

a pair of test plugs receivable in operative engagement with a pair of over-voltage protection receptacles in the remote network unit;

first and second test connectors alternatively receivable in operative engagement with the diagnostic device; and a signal transmission structure configured to connect each of said test plugs with both of said test connectors such that said test plugs, when operatively engaged with the pair of protection receptacles, couple said first test connector with the service source through the remote network unit, and couple said second test connector with the subscriber device through the remote network unit, and thereby enable the diagnostic device to communicate with the service source through said first test connector and alternatively with the subscriber device through said second test connector.

2. An apparatus as defined in claim 1 wherein said test plug, said test connectors and said signal transmission structure are interconnected as a unitary assembly.

3. An apparatus as defined in claim 2 wherein said signal transmission structure comprises wires that are spliced between said test plug and said test connectors.

* * * * *